May 2, 1950  B. W. MANTLE  2,506,306
VALVE
Filed May 17, 1946
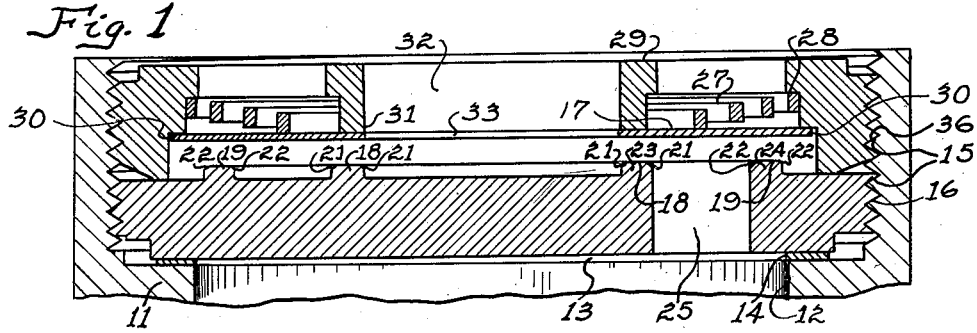
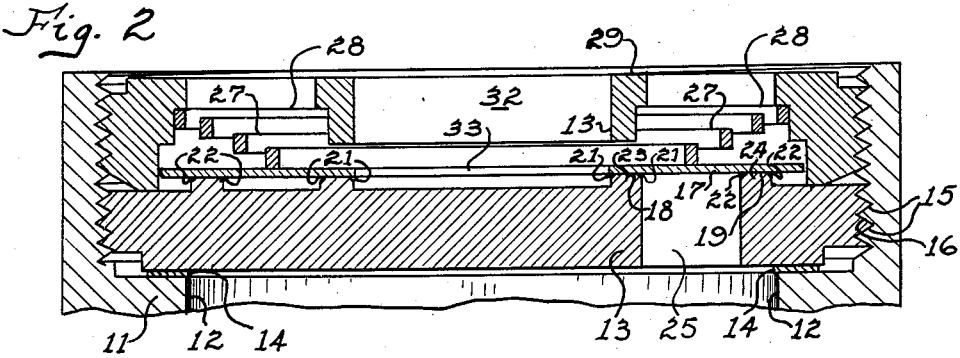
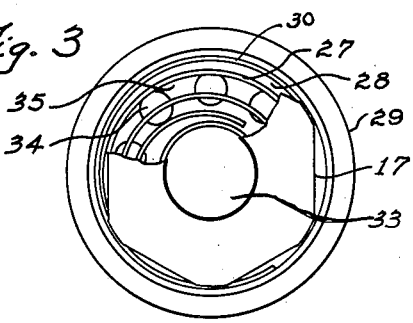
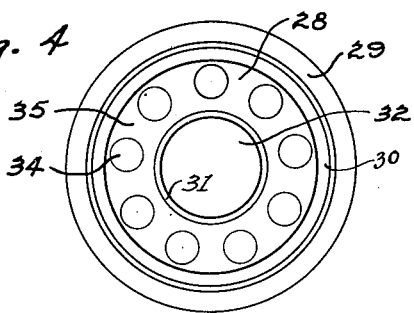
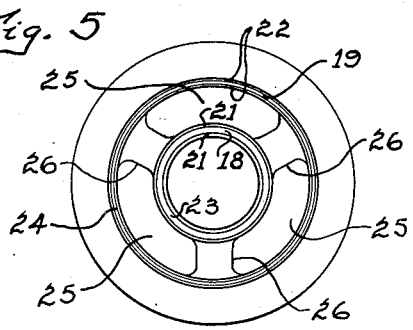
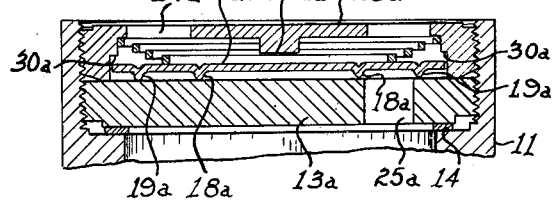
INVENTOR.
Burr W. Mantle
BY Wallace and Cannon
ATTORNEYS

UNITED STATES PATENT OFFICE 2,506,306

VALVE

Burr W. Mantle, Pittsford, N. Y., assignor to American Brake Shoe Company, Wilmington, Del., a corporation of Delaware Application May 17, 1946, Serial No. 670,646

2 Claims. (Cl. 251—119)

The present invention pertains to valves and more particularly to valves of the floating disc type such as check valves which are used to control fluid flow and especially to obtain unidirectional fluid flow. Valves of this character are commonly employed in the exhaust and intake ports of air compressors, air driven motors, and in other like and analogous mechanisms and systems.

Valves of the aforesaid character, and those to which this invention especially pertains, comprise a valve seat member provided with one or more ports through which fluids such as air may flow freely when the valve is open. A free or floating disc element is disposed so as to be lifted from said valve seat when flow proceeds in the desired direction. When flow starts to reverse, as in reciprocating air compressors, for example, the free or floating disc or diaphragm member quickly seats on the valve seat to close the port or ports and prevent reverse flow.

In the past it has been a common practice to mount a spring, for example a compression spring, of suitable strength in such a location as to hold the valve disc in closed position against the valve seat except when fluid pressure in the desired direction is sufficient to open the valve against the force of the spring. When this pressure is reduced, or begins to be reversed, as in reciprocating compressors and motors of pneumatic types, the valve quickly closes. Such springs vary in design, a common type being a spiral non-planar spring which, when fully compressed, is adapted to be flattened substantially into a plane. Regardless of the type of spring used, failures have occurred frequently where valves of the character under discussion are employed in machinery operating at high cyclic rates and fairly high pressures.

I have discovered that a major reason for the frequent failures of valve springs of the character mentioned above is that they are subjected to relatively heavy impact substantially along their entire length, by the valve disc or diaphragm, when operated under heavy load, that is, for example, at high cyclic rates and at high pressures. Apparently the reason for this is that the sudden and complete opening of the valve not only completely compresses the spring but the disc impacts against substantially its whole length, in the case of a spiral spring, or impacts successive turns of a cylindrical coil spring against each other with such force that the spring is more or less continuously battered and hammered so that its life is short. The shortening of spring life may be due to early crystallization from hammering, or it may be due to the setting up or the disturbing of high-frequency vibrations in the body of the spring which results in a change of the crystalline structure. Whatever may be the correct theory, the fact is that springs which are subjected to repeated pounding by the disc or diaphragm of a valve of the type described above fail several times as often as valve springs which are protected against such pounding, according to my invention.

Breakage of springs in the manner mentioned above is serious not only because of the expenses and delays directly incidental to such breakage, but also because broken spring parts may get into more delicate parts of a machine or system and cause major damage. While certain efforts have been made in the past to improve valves of this character, such efforts have not been very successful and it is an object of my invention to substantially reduce or eliminate spring breakage by designing a valve so that the disc element or diaphragm cannot impact against the spring, or cause its parts to impact against each other in the manner aforesaid.

As noted above springs may be spiral or they may be helical and in either case it is desirable to so design the parts of the valve that the disc or diaphragm cannot fully flatten or fully compress the spring so as to cause impact along substantially the entire extent of said spring. So to do is a further object of my invention.

A further and more specific object of my invention is to prevent excessive compression and percussion of springs in valves of the character aforesaid by providing simple and effective stop means to limit the movement of the disc or diaphragm. This is particularly important when the valve is to be opened and closed at a high cyclic rate and under strong impulses which drive the valve open suddenly and forcefully as in reciprocating pneumatic apparatus, for example. A still further object is to accomplish the foregoing without substantially increasing the complexity or the production cost of the valve and without interfering in any manner with rapid and easy assembly or disassembly of the valve elements.

In air compressors and like apparatus it is essential that convenient access be had to valves and that such valves be capable of ready and convenient assembly, and to design a valve having such characteristics is another object of my invention.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a vertical sectional view of a disc or diaphragm type valve embodying my invention;

Fig. 2 is a view similar to Fig. 1 showing certain parts in another position;

Fig. 3 is a top plan view of the disc valve element and associated parts, part of the disc being broken away to show other parts more clearly;

Fig. 4 is a plan view of the valve retainer;

Fig. 5 is a plan view of the valve seat; and

Fig. 6 is a sectional view, somewhat similar to Fig. 2, of a modified valve.

Referring first to Figs. 1 and 2, a valve plate or cylinder head 11 is shown, passage from which may be the upper part of a cylinder head as in a reciprocating type air compressor provided with a piston or analogous cyclical fluid pump not shown. The valve head 11 is provided internally with a flange 12 against which a valve seat member 13 may be firmly set, a suitable sealing gasket 14 of any suitable material being provided. Above the flange 12 the valve chamber 11 is provided internally with threads 15 which cooperate with threads 16 on the exterior of the valve seat member 13. By means of an appropriate tool, such as a spanner type wrench, the valve seat 13 may be threaded into position and firmly tightened against the sealing gasket.

Above the valve seat member 13, a closure disc or diaphragm 17 is provided. In the position shown in Fig. 2 the disc is positioned against the raised annular seating elements 18 and 19 of the valve seat member 13. This is the closed position of the valve, the valve being shown open in Fig. 1. Although, in the arrangement shown, fluid flows from below, it will be understood that the valve might be inverted so as to permit flow from above, or any other arrangement desired might be made, the operation of the parts as shown not necessarily being dependent upon gravity. For some applications, however, the valve may be operated at least in part by gravity, as explained hereinbelow.

The inner annular seat 18 of the valve seat member 13 is provided with chamfered edges as indicated at 21 and the other or outer annular seat 19 is similarly provided with chamfered edges 22. The provision of these chamfered edges on the actual seating elements is a feature of my invention which has at least two advantages. In the first place the chamfering of the raised annular seats reduces the surface area which contacts the valve disc or diaphragm 17. Reduction in this area increases the unit pressure between the disc and the seats and thereby enhances the sealing effect, assuming that the seats are machined with a sufficient degree of accuracy. These surfaces are indicated at 23 and 24, respectively, on elements 18 and 19.

Another advantage of the chamfered edges resides in the protection they afford to the seating surfaces 23 and 24. These surfaces, as well as the valve disc 17, must be accurately finished if a fluid-tight seal is to be realized. The valve seat is provided with a plurality of openings 25 through which fluid, for example, air from or to the compressor piston or the like, is admitted. Three such openings are shown in the drawings, being separated by lands or web portions 26. As noted above a suitable tool such as a spanner-type wrench may be inserted into openings 25 to screw or unscrew the valve seat 13 in the valve plate or head 11. By chamfering the edges of the raised annular seating elements any abrasion or impact between the tool and such elements does not affect the actual seating surface. Likewise, when the valve parts are disassembled, any minor blows in ordinary handling are likely to be taken by a chamfered edge portion whereas if the raised elements were formed with square corners any light impact might raise a protuberance or make a dent which would result in a leaky and unsatisfactory valve.

The valve seat may be forged from suitable material such as iron, steel, bronze, brass, or powdered metal, the seating elements 23 and 24 being carefully machined and ground. The disc closure element 17 is preferably of a suitable steel or alloy of high strength and is preferably finished by grinding both sides so that it may be reversed. As shown in the drawings, the disc 17 is preferably angular in shape, for example hexagonal, and as shown in Figs. 1, 2 and 3 is provided with a central opening so that fluid may pass around the outside and through the center thereof. However, the central opening is not essential, and if desired, the entire flow may be around the outside of the valve. In this case the overall diameter of the valve may be somewhat reduced, such an arrangement being shown in Fig. 6.

In order to assure seating and a fluid-tight valve assembly, the annular seating surfaces of the valve seat are preferably faced at the same time that other parts such as the threads are machined. This assures that the seating surfaces are true with the threads 16.

As shown in Fig. 2 the valve disc or diaphragm member 17 is closed against valve seat 13 by a spring 27. When pressure above the valve becomes sufficient to overcome the spring 27 the valve is opened to the position shown in Fig. 1. The spring 27, as shown herein, is of the spiral non-planar type mentioned above, the central portion being projected out of the plane of the outer turn of the spring when the spring is in its normal or expanded state. When the spring is compressed, as in Fig. 1, the central portion may be forced toward a position where its inner turns lie in the same plane as the outer turns, so that all like elements of the spring approach a position in a common plane. As shown herein, the outer turns of the spring are seated in an annular recess 28 provided in a valve retaining member 29.

As mentioned above, numerous valve spring failures have occurred because the parts have been so arranged that on forceful opening of the valve the spring has been hammered flat, the disc 17 impacting against the spring substantially throughout its entire length while it is fully compressed. In order to prevent such impact, which, as noted above, is a major cause of spring breakage, I provide the valve retaining member 29 with a stop member shown as an outer annular shoulder 30, Figs. 1 to 4, and with a projecting inner stop member 31 which may also be annular as shown in Figs. 1 to 4. In Fig. 6 the outer stop shoulder is shown at 30a and an inner stop member is shown at 31a. The outer stops 30 or 30a, combined with the central stops 31 or 31a serve to limit movement of the valve disc away from the valve seat when the valve is opened forcibly. Thus the outer stop shoulder 30 or 30a serves to stop or support the corners of the valve disc and the inner stop element 31 or 31a serves to stop or support the central part of the disc so that the disc cannot fully compress the spring or impact against the spring in its fully compressed condition. This takes the shock off the spring and very materially reduces the frequency of breakage.

In the form of my invention shown in Figs. 1 to 5, the retainer is provided with a central aperture 32 within the raised annular stop portion 31 which aperture registers with a central opening 33 in the valve disc so that fluid may pass therethrough. Also, since the valve disc or diaphragm 17 is preferably angular, for example hexagonal, so that the corners may rest on shoulder 30, fluid may flow around the edges thereof intermediate the corners and pass on through openings 34 in the retainer 29. There are a plurality of openings 34 formed in the spring supporting recess 28 of the retainer, such openings being separated by web portions 35 which support the spring 27.

In the form shown in Fig. 6, the parts are the same as in Figs. 1 to 5, except that the valve seat 13a is smooth and annular projections 18a and 19a are carried by the disc 17a. Also, the retainer 29a is provided with a central stud 31a in place of the annular stop 31, the central openings 32 in the disc and 34 in the retainer, Figs. 1 to 4, being omitted in this figure. Suitable openings 25a are provided in the seat 13a and in the retainer 29a are openings 34a. The flow past the diaphragm 17a is entirely around the edges thereof since this form has no central aperture.

The outer periphery of the retainer is preferably threaded as at 36 to screw into the internal threads 15 of the valve plate or head 11 in the same manner as the valve seat.

It will of course be understood that the spring 27 need not necessarily be of the design shown and described above. Other types of springs, such as helical springs may be employed for some purposes and the same principles of stopping movement of the valve disc by one or more shoulders or stops such as the stops 30, 30a, 31 or 31a which is positioned above or beyond the point where the spring can be fully compressed are applicable. The essential structure is one which prevents repeated shock to the spring resulting from impact with the entire body thereof incident to full compression. Obviously, for many purposes, only one of the stop shoulders as outer stop 30, 30a or inner stop 31, 31a may be required.

It will be understood further that although the various parts such as the valve seat 13 and the retaining member 29 have been described as located in the valve housing by means of screw threads 15, 16 and 36, the parts might be assembled and held in position in other well-known ways, for example by the use of sliding parts and suitable clamping and sealing elements. It will also be apparent that the arrangement of parts for fluid flow may be varied as desired.

In ordinary operation the valve disc remains in position against the seating surfaces 23 and 24 to keep the valve closed until pressure from above is sufficient to overcome the compression-loaded spring 27. When this occurs the disc moves away from the seat and fluid, such as air from a compressor piston, flows around the outer edges of the disc and through the ports or openings 34 of the retainer as previously explained. Fluid flows also through the central openings 32 and 33 of the valve disc and the retainer.

If pressure is applied suddenly and forcibly the valve disc may be driven with considerable force away from the seat and into contact with the stop elements or shoulders 30 and 31 on the retainer. Even in this case no damage occurs to the spring 29 which is not fully compressed because of the protection afforded by the raised elements 30 and 31.

When the pressure impulse has subsided or begins to reverse the spring 27 quickly returns the valve disc 17 to closed position against the seating elements 23 and 24. Because of the reduced area of these surfaces resulting from chamfering their edges, a relatively high pressure per unit area results in a very good seal as previously mentioned, even though the spring 27 is relatively light. In many applications, back pressure tends to close the valve, and the spring 27 is thereby assisted in closing the valve. In fact, in some cases it has been found that the spring 27 may be dispensed with altogether.

It has been found that broken springs are a major source of difficulty in valves of the type described above and that this invention greatly reduces their frequency and consequently reduces injury and damage which may be caused to other moving parts by broken spring fragments. It also greatly reduces the annoyance and lost time directly caused by broken springs which must be replaced. The disc member 17 is made of a good grade of sheet metal, preferably a suitable steel, and the retaining member, or at least the raised elements 30 and 31 thereof, are preferably made of a material, such as a fairly hard steel, which will withstand repeated hammering by the disc without injury.

The simplicity of the parts facilitates their assembly and replacement and cleaning has been seldom required. While I have described this improved valve structure as being useful, for example, in connection with air compressors and related pneumatic apparatus, it will be apparent that other uses may be made thereof. Also, although I have mentioned particular materials, methods of finishing, and manners of assembly it will be understood that my invention is not necessarily limited thereto. Further, while I have described and illustrated the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In a replaceable valve structure, a mounting member having a threaded mounting socket, a pair of circular plates threaded about their outer edges and disposed in face to face relation in said threaded socket, each of said plates having an annular row of air passages formed therethrough in inwardly spaced relation with respect to said threaded edges, one of said plates having a circular valve chamber formed therein in a centered relation with respect to said annular rows of openings and extending outwardly beyond said rows for a substantial distance, said one of said plates also having an annular mounting recess formed therein concentric with said valve chamber but of a slightly smaller outer diameter so as to define an annular abutment shoulder about said annular recess on both its inner and outer edges, a non-circular floating valve disc mounted in said chamber for movement between an open position in engagement with said inner and outer shoulders and a closed position in engagement with the other of said plates so as to close the air passages in said other of said plates, said non-circular valve disc having its outer edge formed to afford a passage between such edge and said outer shoulder when said valve disc is in said open position, and a non-planar spiral compression spring seated in said mounting recess and engaging said valve disc to urge the same to said closed position.

2. In a replaceable valve structure, a mounting member having a threaded socket defining the inlet or outlet port of an air compressor or the like, a pair of circular plates threaded about their outer edges and disposed in face to face relation in said threaded socket, each of said plates having an annular row of air passages formed therethrough in inwardly spaced relation with respect to said threaded edges, one of said plates having a circular valve chamber formed therein in a centered relation with respect to said annular rows of openings and extending outwardly beyond said rows for a substantial distance, said one of said plates also having an annular mounting recess formed therein concentric with said valve chamber but of a slightly smaller outer diameter so as to define an annular abutment shoulder about said annular recess on both its inner and outer edges, a non-circular floating valve disc mounted in said chamber for movement between an open position in engagement with said inner and outer shoulders and a closed position in engagement with the other of said plates so as to close the air passages in said other of said plates, said non-circular valve disc having its outer edge formed to afford a passage between such edge and said outer shoulder when said valve disc is in said open position, and a non-planar spiral compression spring having its outer coil seated in said mounting recess adjacent the outer edge of the mounting recess and having its inner coil disposed radially inwardly of said outer coil and engaging said valve disc to urge the same to its closed position.

BURR W. MANTLE.

REFERENCES CITED

The following references are of record in the file of this patent:

UNITED STATES PATENTS

| Number | Name | Date |
|---|---|---|
| 1,185,412 | Kramer | May 30, 1916 |
| 1,269,616 | Le Bozec | June 28, 1918 |
| 1,708,158 | Steedman | Apr. 9, 1929 |
| 1,718,350 | Greenwald | June 25, 1929 |
| 1,751,261 | Wilson | Mar. 18, 1930 |
| 1,777,647 | Marchal | Oct. 7, 1930 |
| 1,846,753 | Rayfield | Feb. 23, 1932 |
| 1,972,737 | Hewitt | Sept. 4, 1934 |
| 2,239,405 | Stenger | Apr. 22, 1941 |
| 2,289,651 | Horton | July 14, 1942 |